(12) United States Patent
Kershteyn

(10) Patent No.: US 7,697,803 B2
(45) Date of Patent: Apr. 13, 2010

(54) SYSTEMS AND METHODS FOR PHASE CONTROL FOR RZ-DQPSK MODULATION

(75) Inventor: Boris Kershteyn, Marietta, GA (US)

(73) Assignee: Ciena Corporation, Linthicum, MD (US)

( * ) Notice: Subject to any disclaimer, the term of this patent is extended or adjusted under 35 U.S.C. 154(b) by 365 days.

(21) Appl. No.: 11/873,061

(22) Filed: Oct. 16, 2007

(65) Prior Publication Data

US 2009/0097864 A1    Apr. 16, 2009

(51) Int. Cl.
*G02B 6/28* (2006.01)
(52) U.S. Cl. .................... 385/24; 385/15; 398/182; 398/183; 398/188
(58) Field of Classification Search .................. 385/15, 385/24; 398/182, 183, 188
See application file for complete search history.

(56) References Cited

U.S. PATENT DOCUMENTS

| 4,680,556 | A | * | 7/1987 | Nakamura et al. | .......... 332/103 |
| 2009/0238571 | A1 | * | 9/2009 | Nakamura et al. | ............ 398/97 |

* cited by examiner

*Primary Examiner*—Jennifer Doan
(74) *Attorney, Agent, or Firm*—Clements Bernard PLLC; Christopher L. Bernard; Tyler S. Brown

(57) ABSTRACT

RZ-DQPSK (Return-to-Zero Differential Quadrature Phase Shift Keying) systems and methods are provided with a single real-time phase alignment mechanism. The present invention eliminates the requirement for phase adjustment between a carver modulator and a DQPSK modulator. In an exemplary embodiment, the present invention replaces the carver modulator with AND gates between drivers of a DQPSK modulator and a data processor. The AND gates are configured to provide a single phase alignment signal.

20 Claims, 3 Drawing Sheets

FIG. 1. *Prior Art*

SYSTEMS AND METHODS FOR PHASE CONTROL FOR RZ-DQPSK MODULATION

FIELD OF THE INVENTION

The present invention relates generally to optical modulation, and more particularly, to systems and methods for a Return-to-Zero Differential Quadrature Phase Shift Keying (RZ-DQPSK) optical modulation system with a single phase alignment mechanism for aligning both phases of a clock source with a modulator and phases of two data streams with the modulator.

BACKGROUND OF THE INVENTION

Conventional fiber optic communication systems are well-developed for transmitting high-data rate signals, such as 10 Gbps and 40 Gbps. However, rates of fiber optic communication systems are being pushed towards ever increasing speeds due to rapid growth in networks. For example, current standards bodies (e.g., IEEE) are considering data rates of 100 Gbps, which would require ever higher transmission rates (i.e., approximately 112 Gbps), once forward error correction (FEC) and framing (e.g., G.709) overheads are considered. Other standards bodies (e.g., ITU-T) are considering data rates of 120 Gbps, again requiring even higher transmission rates (i.e., approximately 130 Gbps). Such high-data rates are beyond the limit of conventional electronics and optics. For example, conventional systems utilize a direct binary modulation scheme. Disadvantageously, direct binary modulation schemes have poor spectral efficiency which limits overall transmission system utilization in wavelength division multiplexed (WDM) systems, and such schemes are difficult to implement directly with conventional electronics due to the high data rates.

Differential Quadrature Phase Shift Keying (DQPSK) can be utilized as a modulation format for improved spectral efficiency. Additionally, DQPSK provides an improved tolerance to chromatic dispersion and reduces other deleterious effects. DQPSK modulates data onto the phase of a laser in a differential way. At the demodulator, a delay line interferometer is utilized to identify the signal. Advantageously, DQPSK enables two bits to be transmitted per symbol, so a 40 Gbs or 100 Gbps data rate signal could be transmitted on a 20 Gbps or 50 Gbps carrier, respectively. Advantageously, this provides higher effective transmission rates while utilizing lower speed rates for electronic components. Also, DQPSK can be utilized with Return-to-Zero (RZ) line coding in optical transmission systems.

In RZ-DQPSK modulation, it is essential to control phase between the RZ portion of the system and the DQPSK portion of the system. DQPSK includes an in-phase signal (I data) and a quadrature signal (Q data). For example, a 100 Gbps signal is broken into two separate 50 Gbps signal streams which are referred to as the I and Q data. This is called preceding. The I and Q data are precoded from a data processor and precoder and then modulated in the DQPSK format, i.e. each of the I and Q data streams are provided to separate arms of the DQPSK modulator. Note, phase must be aligned between the I and Q data streams in the DQPSK portion.

Additionally, the RZ portion also requires phase alignment. The phase between the RZ and DQPSK portions represents an additional phase control to the system from the phase control required between the I and Q data. Accordingly, RZ-DQPSK systems require two feedback systems to process and correct phase differences including a DQPSK feedback system to control phase differences between I and Q data and an RZ portion feedback system to control phase differences between a carver clock and a DQPSK modulator output.

Referring to FIG. 1, in a conventional RZ-DQPSK system 10, a distributed feedback (DFB) laser 12 is connected to a carver modulator 14. The carver modulator 14 is modulated with an electrical clock from a clock source 16 through a voltage controlled phase shifter 18 applied to a carver driver 20. The output of the carver modulator 14 is connected to a DQPSK modulator 22. A data processor/precoder/multiplexer 24 receives an input data stream, and precodes the data stream into I and Q data which is supplied to modulator drivers 26,28. The output of the DQPSK modulator 22 includes a tap to provide a portion of the output to a monitor and control circuit 30. For example, the tap splits a small portion (e.g., 5%) of the optical signal for monitoring. The monitor and control circuit 30 is configured to detect the signal and the associated phase differences between I and Q data and the associated phase differences between the carver clock 10 and the DQPSK modulator 22 output.

The control circuit 30 provides a control signal to the data processor/precoder/multiplexer 24 to adjust phase between data fed to the I and Q arms of the modulator drivers 26,28. The control circuit 30 provides another control signal to a phase controller 32 to adjust phase between the carver modulator 14 and the DQPSK modulator 22. The phase controller 32 connects to the phase shifter 18 to provide a reference signal. The control circuit 30 is operable to provide continuous correction of both the phase between I and Q arms of the modulator drivers 26,28 and between the carver modulator 14 and the DQPSK modulator 22. Additionally, the carver modulator 14 together with the clock source 16 can be located after the DQPSK modulator 22. Here, the DFB laser 12 is directly connected to the DQPSK modulator 22.

Disadvantageously, existing RZ-DQPSK systems 10 require two separate phase control loops resulting in additional circuitry, complexity, and cost. Additionally, existing RZ-DQPSK systems 10 require the carver modulator 14. It would be advantageous to provide single real-time phase alignment systems and methods for all phase alignments to reduce components, cost, and space in RZ-DQPSK systems 10. Further, it would be advantageous to remove the need for a separate carver modulator 14 in RZ-DQPSK systems 10.

BRIEF SUMMARY OF THE INVENTION

In various exemplary embodiments, RZ-DQPSK systems and methods are provided with a single real-time phase alignment mechanism. The present invention eliminates the requirement for phase adjustment between a carver modulator and a DQPSK modulator. In an exemplary embodiment, the present invention replaces the carver modulator with AND gates between drivers of a DQPSK modulator and a data processor. The AND gates are configured to provide a single phase alignment signal. The present invention is illustrated herein with regards to a RZ-DQPSK modulation system. Those of ordinary skill in the art will recognize the systems and methods described herein can apply to any RZ-based system which requires multiple phase alignment control systems to simplify the system with a single control system.

In an exemplary embodiment of the present invention, a Return-to-Zero Differential Quadrature Phase Shift Keying (RZ-DQPSK) modulation system with single phase alignment control includes a clock source, first and second phase shifters, wherein each of the first and second phase shifters are connected to the clock source, first and second logical AND gates each including two inputs and an output, wherein the inputs to the first logical AND gate include an output of the first phase shifter and a first data stream, and wherein the inputs to the second logical AND gate include an output of the second phase shifter and a second data stream, a DQPSK modulator including first and second modulator drivers, wherein the first modulator driver is driven by the output of the first logical AND gate, and wherein the second modulator driver is driven by the output of the second logical AND gate, an optical splitter connected to an output of the DQPSK modulator, a monitor and control circuit connected to the optical splitter, wherein the monitor and control circuit is configured to monitor phase alignment differences between the first and second data streams and to provide a control signal responsive to phase alignment differences, and a data precoder configured to provide the first and second data streams, wherein the control signal is connected to the data precoder and the data precoder is configured to adjust phase between the first and second data streams responsive to the control signal. The RZ-DQPSK modulation system with single phase alignment control further includes an initial phase control applied to the first and second phase shifter, wherein the initial phase control is configured to provide a one-time phase alignment between the clock source and the first and second data streams. Optionally, the initial phase control is performed in manufacturing. Alternatively, the RZ-DQPSK modulation system with single phase alignment control further includes a distributed feedback laser connected to the DQPSK modulation system. Optionally, the clock source is a return-to-zero clock source. The first data stream includes in-phase data (I data) and the second data stream includes quadrature data (Q data). Optionally, the data precoder includes a DQPSK precoder configured to receive a single data stream and to precode the data stream into the first and second data streams for DQPSK modulation. Advantageously, the RZ-DQPSK modulation system includes no carver modulator. Additionally, the control signal is the only phase alignment signal for all phase adjustments associated with the RZ-DQPSK modulation system.

In another exemplary embodiment of the present invention, a dynamic phase adjustment method for a Return-to-Zero Differential Quadrature Phase Shift Keying (RZ-DQPSK) modulation system includes aligning phase between a clock source and a DQPSK modulator, providing a first and second data stream, performing a first logical AND function between the first data stream and the clock source and a second logical AND function between the second data stream and the clock source, driving the DQPSK modulator with outputs from the first and second logical AND functions, monitoring an output of the DQPSK modulator for phase differences between the first and second data stream, and adjusting the first and second data streams responsive to phase differences. The aligning phase step is performed once, and comprises an initial phase control applied to a first and second phase shifter, wherein the initial phase control is configured to provide a one-time phase alignment between the clock source and the first and second data streams. Optionally, the aligning phase is performed in manufacturing. The first data stream includes in-phase data (I data) and the second data stream includes quadrature data (Q data). The dynamic phase adjustment method further includes the step of preceding a single data stream to provide the first and second data streams, wherein the precoding includes adapting the single data stream for DQPSK modulation. Advantageously, the dynamic phase adjustment method includes no carver modulator. Additionally, the dynamic phase adjustment method utilizes a single phase alignment mechanism for all phase adjustments associated with the RZ-DQPSK modulation system.

In yet another exemplary embodiment of the present invention, a Return-to-Zero Differential Quadrature Phase Shift Keying (RZ-DQPSK) modulation system includes a clock source, a DQPSK modulator, a data precoder providing a first and second data stream, means for initially aligning phase of the clock source with phase of the DQPSK modulator, means for dynamically aligning phase of the first and second data stream, first and second logical AND gates each comprising an output connected to inputs of the DQPSK modulator, wherein inputs to the first logical AND gate include the first data stream and the clock source, and wherein inputs to the second logical AND gate include the second data stream and the clock source. Optionally, the first data stream includes in-phase data (I data) and the second data stream includes quadrature data (Q data). Advantageously, the means for dynamically aligning phase is the only continuous phase alignment signal for all phase adjustments associated with the RZ-DQPSK modulation system. Additionally, the RZ-DQPSK modulation system includes no carver modulator.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, RZ-DQPSK systems and methods are provided with a single real-time phase alignment mechanism. The present invention eliminates the requirement for phase adjustment between a carver modulator and a DQPSK modulator. In an exemplary embodiment, the present invention replaces the carver modulator with AND gates between drivers of a DQPSK modulator and a data processor. The AND gates are configured to provide a single phase alignment signal. Advantageously, the single real-time phase alignment mechanism of the present invention reduces cost and space requirements associated with conventional RZ-DQPSK designs to provide a simpler modulation system with fewer phase alignment control components.

Figure 1:
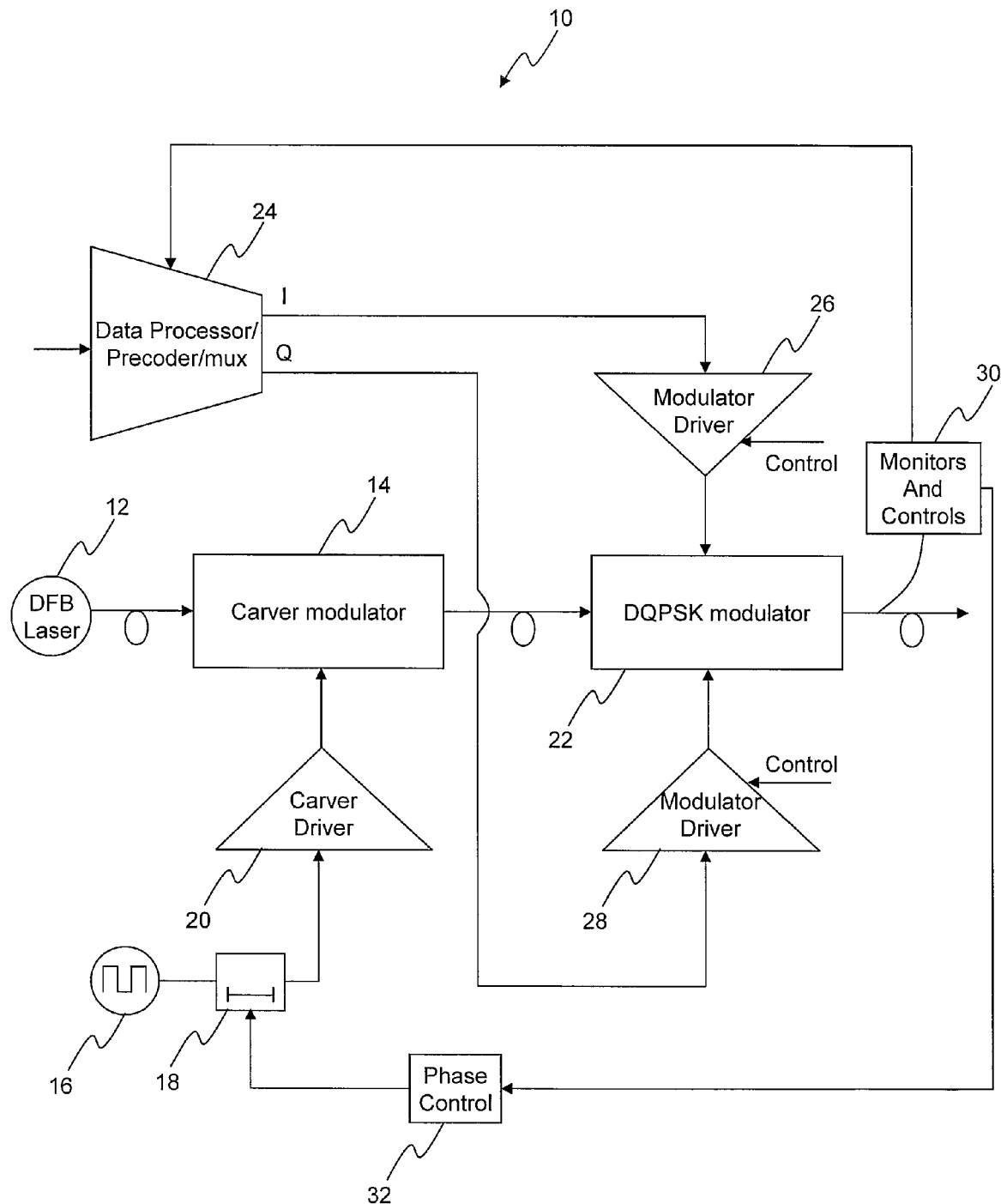
FIG. 1 is a block diagram of a conventional RZ-DQPSK modulation system with a carver modulator and a DQPSK modulator.
Figure 2:
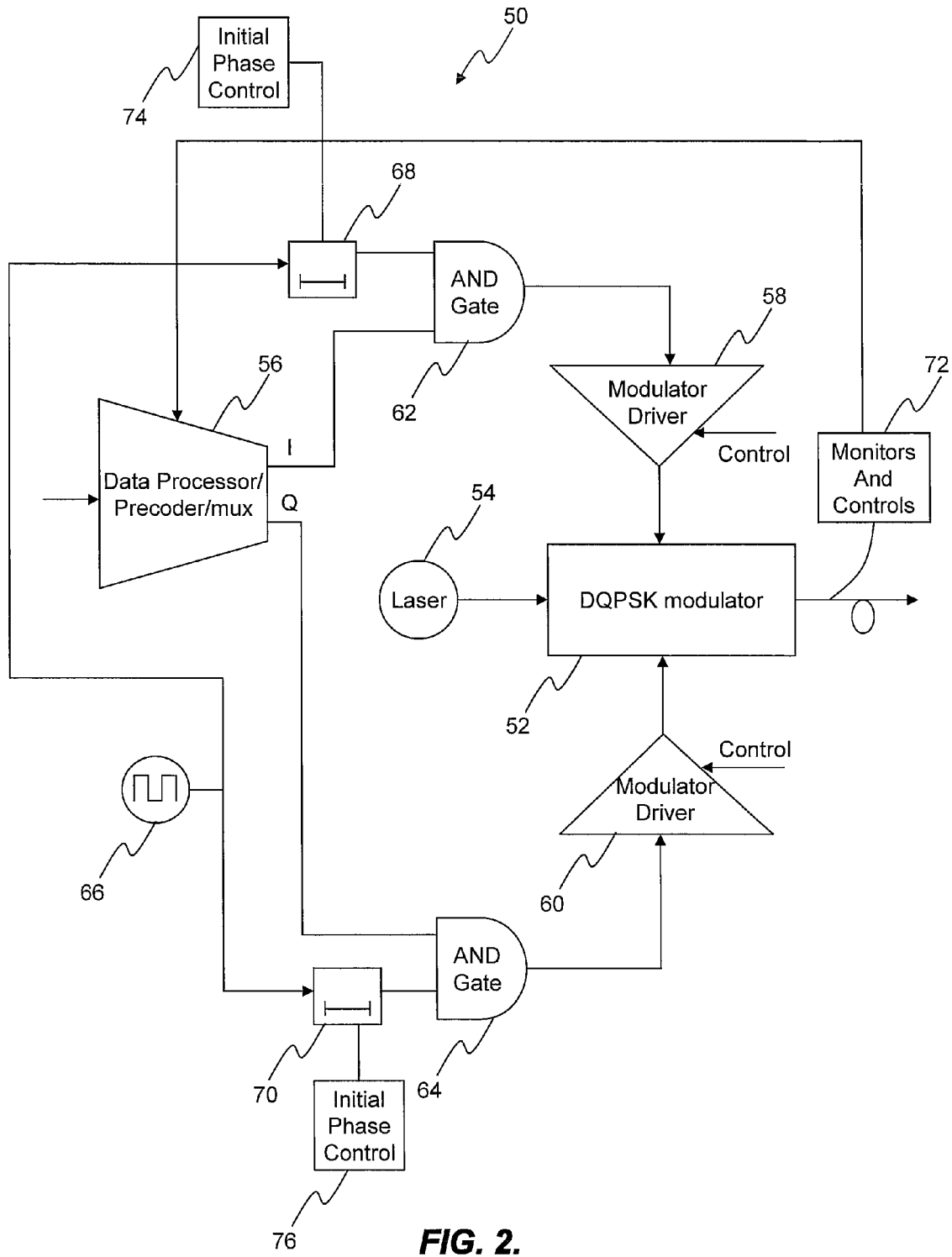
FIG. 2 is a block diagram of an RZ-DQPSK modulation system configured with single phase alignment according to an exemplary embodiment of the present invention.

Referring to FIG. 2, an RZ-DQPSK modulation system 50 is illustrated according to an exemplary embodiment of the present invention. The RZ-DQPSK modulation system 50 is configured without a carver modulator, and thus does not require dynamic continuous phase adjustment between the carver modulator and a DQPSK modulator 52. Elimination of the carver modulator also removes the carver driver, providing reduced part count, cost, and space.

The RZ-DQPSK modulation system 50 includes a DFB laser 54 with an output connected directly to the DQPSK modulator 52. The RZ-DQPSK modulation system 50 also includes a data processor/precoder/multiplexer 56. The data processor/precoder/multiplexer 56 is generally configured to receive an input stream of data, and to process the data to precode it into I and Q data streams for DQPSK modulation. For example, an input stream can include a 40 Gbps signal, and the data processor/precoder/multiplexer 56 is configured to convert the 40 Gbps signal into two I and Q data streams for DQPSK modulation. As described herein, DQPSK is a two bit per symbol modulation formation, and therefore the I and Q data streams can include two 20 Gbps signals which can be combined at a DQPSK demodulator to provide the 40 Gbps signal.

In lieu of a carver modulator, outputs of the I and Q data streams from the data processor/precoder/multiplexer 56 are connected to modulator drivers 58,60 through AND gates 62,64. The AND gates 62,64 are two-input logic devices configured to provide an output of a logical AND function responsive to two inputs. The output of the AND gates 62,64 is connected to the modulator drivers 58,60 which provide the I and Q data to the DQPSK modulator 52.

The RZ-DQPSK modulation system 50 also includes a clock source 66, such as an RZ clock. The clock source 66 is spliced two ways. One signal from the clock source 66 is connected to a second input of the AND gate 62 through a phase shifter 68. Another signal from the clock source 66 is connected to a second input of the AND gate 64 through a phase shifter 70.

The DQPSK modulator 52 includes a tap off of the output. For example, the tap can include an optical splitter configured to direct a portion of the output of the DQPSK modulator 52 to a monitor and control circuit 72, such as a 5% power splitter. The monitor and control circuit 72 includes a photo-detector configured to measure the output of the DQPSK modulator 52 and generate a control signal based on phase differences. The control signal is connected to the data processor/precoder/multiplexer 56.

The RZ-DQPSK modulation system 50 is configured to solely monitor and correct for phase differences between the I and Q data streams. Advantageously, the RZ-DQPSK modulation system 50 requires no real-time dynamic phase alignment control of the clock source 66. Instead, control of the clock source 66 is provided from initial phase controllers 74,76 which provide one-time fixed alignment of the clock source 66 phase alignment, such as during initial manufacturing.

In an exemplary embodiment of the present invention, the initial phase controllers 74,76 are connected to the phase shifters 68,70. The initial phase controllers 74,76 are configured to provide an initial phase alignment between the clock source 66 and the I and Q data streams from the data processor/precoder/multiplexer 56. The monitor and control circuit 72 is configured to adjust cumulative phase shifts between the I and Q data streams due to time, temperature, and other conditions.

The AND gates 62,64 are operable to lock phase alignment of the clock source 66 with phase alignment from the monitor and control circuit 72. Accordingly, any phase shifts in the clock source 66 are compensated by the monitor and control circuit 72. This provides a single, real-time phase alignment control mechanism for both the I and Q data streams and the clock source 66.

Figure 3:
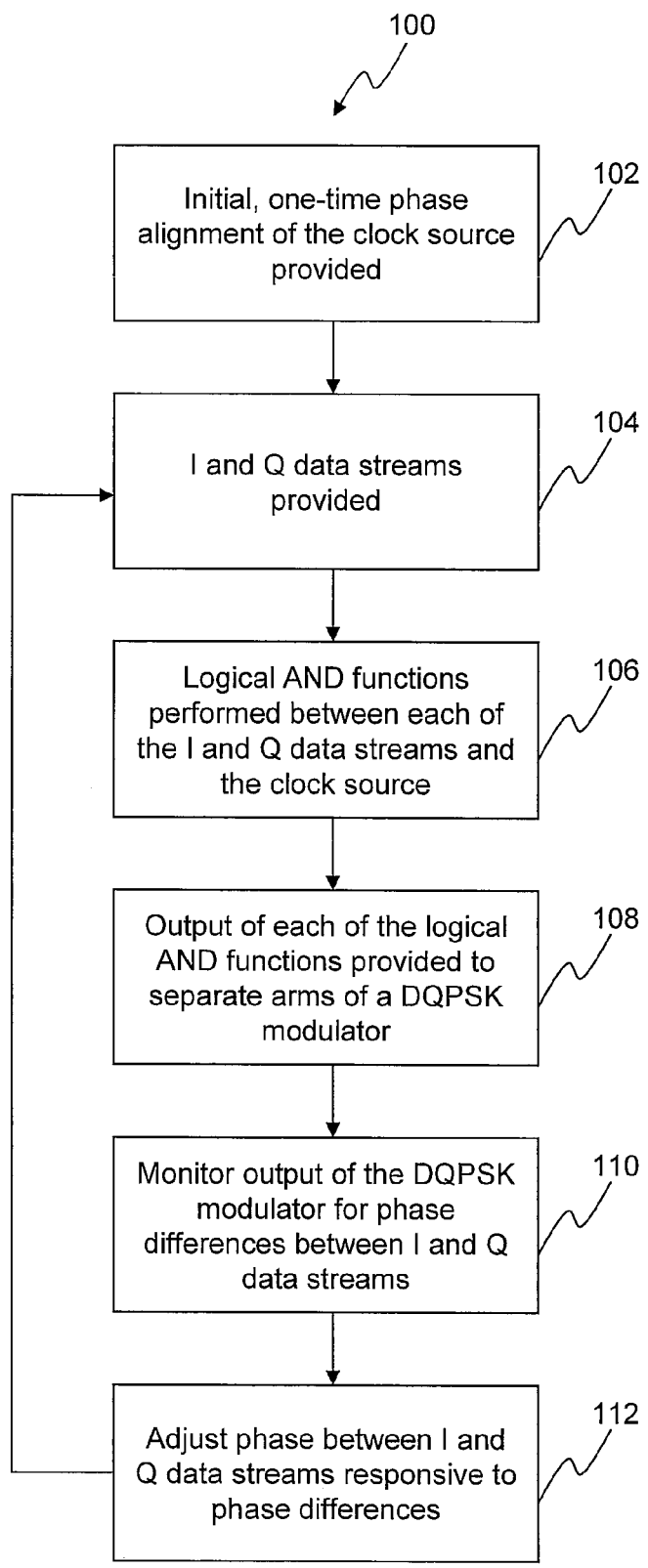
FIG. 3 is a flowchart illustrating phase control of an RZ-DQPSK modulation system with a single phase alignment signal according to an exemplary embodiment of the present invention.

Referring to FIG. 3, a flowchart illustrates an RZ-DQPSK modulation control mechanism 100 utilizing a single phase alignment signal to adjust all phase differences associated with the RZ-DQPSK modulation. First, an initial, one-time phase alignment of a clock source is provided (step 102). This can be during manufacturing or initial system turn-up. Here, a clock source, such as an RZ clock source, is aligned with respect to I and Q data streams. The clock source is fed into two phase shifters, one each for the I and Q data streams. The phase shifters are set with an initial phase control based upon the one-time phase alignment.

I and Q data streams are provided (step 104). The I and Q data streams are precoded from a single data source to provide I and Q data streams in the format applicable to DQPSK modulation. Logical AND functions are performed between each of the I and Q data streams and the clock source (step 106). The logical AND functions provide an output of "1" when the clock source is "1" and the I or Q data stream is "1" and an output of "0" for all other combinations.

Effectively, the logical AND functions lock the I and Q data streams with the clock source, providing an output of "1" only when both the data streams and clock source are "1", and "0" all other times. This allows a single phase alignment signal to be utilized to control the phase alignment only between the I and Q data streams, and the resulting control for the clock source is automatic based upon the alignment of the I and Q data streams due to the AND functions.

Each output of the logical AND functions is provided to separate arms of a DQPSK modulator (step 108). This provides a phase-aligned output (i.e., phase-aligned between the data streams and clock source) for the DQPSK modulator. The output of the DQPSK modulator is monitored for phase differences between the I and Q data streams (step 110). The monitoring can include an optical splitter connected to a photo-detector and control circuit. Here, the monitoring determines what, if any, phase differences are seen at the DQPSK modulator output, and accordingly provides an error signal. The phase between the I and Q data streams is adjusted responsive to the phase differences (step 112). This provides phase alignment of the I and Q streams, and the RZ-DQPSK modulation control mechanism 100 returns to step 104 in a continuous loop providing phase aligned I and Q data streams and phase aligned clock source with the data streams to the DQPSK modulator.

Advantageously, the present invention provides systems and methods for simplified phase alignment control associated with RZ-DQPSK modulation. The single, real-time phase alignment mechanism provides reduced cost, space, etc. The present invention removes the need altogether for an optical carver module. The present invention is illustrated herein with regards to a RZ-DQPSK modulation system. Those of ordinary skill in the art will recognize the systems and methods described herein can apply to any RZ-based system which requires multiple phase alignment control systems to simplify the system with a single control system.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A Return-to-Zero Differential Quadrature Phase Shift Keying (RZ-DQPSK) modulation system with single phase alignment control, comprising:

a clock source;

first and second phase shifters, wherein each of the first and second phase shifters are connected to the clock source;

first and second logical AND gates each comprising two inputs and an output, wherein the inputs to the first logical AND gate comprise an output of the first phase shifter and a first data stream, and wherein the inputs to the second logical AND gate comprise an output of the second phase shifter and a second data stream;

a DQPSK modulator comprising first and second modulator drivers, wherein the first modulator driver is driven by the output of the first logical AND gate, and wherein the second modulator driver is driven by the output of the second logical AND gate;
an optical splitter connected to an output of the DQPSK modulator;
a monitor and control circuit connected to the optical splitter, wherein the monitor and control circuit is configured to monitor phase alignment differences between the first and second data streams and to provide a control signal responsive to phase alignment differences; and
a data precoder configured to provide the first and second data streams, wherein the control signal is connected to the data precoder and the data precoder is configured to adjust phase between the first and second data streams responsive to the control signal.

2. The RZ-DQPSK modulation system with single phase alignment control of claim 1, further comprising an initial phase control applied to the first and second phase shifter, wherein the initial phase control is configured to provide a one-time phase alignment between the clock source and the first and second data streams.

3. The RZ-DQPSK modulation system with single phase alignment control of claim 2, wherein the initial phase control is performed in manufacturing.

4. The RZ-DQPSK modulation system with single phase alignment control of claim 1, further comprising a distributed feedback laser connected to the DQPSK modulation system.

5. The RZ-DQPSK modulation system with single phase alignment control of claim 1, wherein the clock source is a return-to-zero clock source.

6. The RZ-DQPSK modulation system with single phase alignment control of claim 1, wherein the first data stream comprises in-phase data (I data) and the second data stream comprises quadrature data (Q data).

7. The RZ-DQPSK modulation system with single phase alignment control of claim 6, wherein the data precoder comprises a DQPSK precoder configured to receive a single data stream and to precode the data stream into the first and second data streams for DQPSK modulation.

8. The RZ-DQPSK modulation system with single phase alignment control of claim 1, wherein the RZ-DQPSK modulation system comprises no carver modulator.

9. The RZ-DQPSK modulation system with single phase alignment control of claim 1, wherein the control signal is the only phase alignment signal for all phase adjustments associated with the RZ-DQPSK modulation system.

10. A dynamic phase adjustment method for a Return-to-Zero Differential Quadrature Phase Shift Keying (RZ-DQPSK) modulation system, comprising:
aligning phase between a clock source and a DQPSK modulator;
providing a first and second data stream;
performing a first logical AND function between the first data stream and the clock source and a second logical AND function between the second data stream and the clock source;
driving the DQPSK modulator with outputs from the first and second logical AND functions;
monitoring an output of the DQPSK modulator for phase differences between the first and second data stream; and
adjusting the first and second data streams responsive to phase differences.

11. The dynamic phase adjustment method of claim 10, wherein the aligning phase step is performed once, and comprises an initial phase control applied to a first and second phase shifter, wherein the initial phase control is configured to provide a one-time phase alignment between the clock source and the first and second data streams.

12. The dynamic phase adjustment method of claim 10, wherein the aligning phase is performed in manufacturing.

13. The dynamic phase adjustment method of claim 10, wherein the first data stream comprises in-phase data (I data) and the second data stream comprises quadrature data (Q data).

14. The dynamic phase adjustment method of claim 13, further comprising the step of precoding a single data stream to provide the first and second data streams, wherein the preceding comprises adapting the single data stream for DQPSK modulation.

15. The dynamic phase adjustment method of claim 10, wherein the dynamic phase adjustment method comprises no carver modulator.

16. The dynamic phase adjustment method of claim 10, wherein the dynamic phase adjustment method utilizes a single phase alignment mechanism for all phase adjustments associated with the RZ-DQPSK modulation system.

17. A Return-to-Zero Differential Quadrature Phase Shift Keying (RZ-DQPSK) modulation system, comprising:
a clock source;
a DQPSK modulator;
a data precoder providing a first and second data stream;
means for initially aligning phase of the clock source with phase of the DQPSK modulator;
means for dynamically aligning phase of the first and second data stream;
first and second logical AND gates each comprising an output connected to inputs of the DQPSK modulator, wherein inputs to the first logical AND gate comprise the first data stream and the clock source, and wherein inputs to the second logical AND gate comprise the second data stream and the clock source.

18. The RZ-DQPSK modulation system of claim 17, wherein the first data stream comprises in-phase data (I data) and the second data stream comprises quadrature data (Q data).

19. The RZ-DQPSK modulation system of claim 17, wherein the means for dynamically aligning phase is the only continuous phase alignment signal for all phase adjustments associated with the RZ-DQPSK modulation system.

20. The RZ-DQPSK modulation system of claim 17, wherein the RZ-DQPSK modulation system comprises no carver modulator.

* * * * *